(12) United States Patent
Mohi et al.

(10) Patent No.: US 7,308,274 B2
(45) Date of Patent: Dec. 11, 2007

(54) LOCATING SYSTEM AND METHOD

(75) Inventors: Norman Mohi, New York, NY (US); James Hume, Rancho Palos Verdes, CA (US); Kevin Judge, Palos Verdes Estates, CA (US); Mark Scislowski, Bellflower, CA (US)

(73) Assignee: Norbelle, LLC, New York City, NY (US)

( * ) Notice: Subject to any disclaimer, the term of this patent is extended or adjusted under 35 U.S.C. 154(b) by 0 days.

(21) Appl. No.: 11/259,241

(22) Filed: Oct. 25, 2005

(65) Prior Publication Data

US 2006/0035648 A1 Feb. 16, 2006

Related U.S. Application Data

(63) Continuation of application No. 10/421,967, filed on Apr. 23, 2003, which is a continuation of application No. 09/899,612, filed on Jul. 5, 2001, now Pat. No. 6,980,813.

(60) Provisional application No. 60/218,454, filed on Jul. 14, 2000.

(51) Int. Cl.
*H04Q 7/20* (2006.01)

(52) U.S. Cl. .............................. 455/456.1; 455/456.2; 455/456.3; 455/432.1; 455/457; 455/414.2; 342/357.06; 340/426.19

(58) Field of Classification Search .. 455/456.1–456.3, 455/457, 414.2; 342/357.06, 357.08, 357.09; 340/426.19, 426.2, 426.22, 426.23, 573.1
See application file for complete search history.

(56) References Cited

U.S. PATENT DOCUMENTS

| | | | | |
|---|---|---|---|---|
| 5,043,736 A | * | 8/1991 | Darnell et al. | 342/357.1 |
| 5,289,163 A | * | 2/1994 | Perez et al. | 340/539.32 |
| 5,389,934 A | * | 2/1995 | Kass | 342/357.07 |
| 5,485,161 A | * | 1/1996 | Vaughn | 342/357.13 |
| 5,525,967 A | * | 6/1996 | Azizi et al. | 340/572.1 |
| 5,714,932 A | * | 2/1998 | Castellon et al. | 340/539.11 |
| 5,831,576 A | * | 11/1998 | Sheynblat | 342/357.03 |
| 5,900,817 A | * | 5/1999 | Olmassakian | 340/573.1 |
| 6,078,260 A | * | 6/2000 | Desch | 340/573.1 |
| 6,121,922 A | * | 9/2000 | Mohan | 342/357.1 |
| 6,127,931 A | * | 10/2000 | Mohr | 340/573.4 |
| 6,268,798 B1 | * | 7/2001 | Dymek et al. | 340/573.1 |

* cited by examiner

*Primary Examiner*—Steve M. D'Agosta
(74) *Attorney, Agent, or Firm*—Lawrence S. Cohen (57) ABSTRACT

A mobile controller unit has a radio positioning system and a two-way communication system and a rover unit also has a radio positioning system and a two-way radio communication system. The controller unit can query the rover unit to send its location data so that the rover unit can be located and if desired, found, such as in the case of a lost child or items. Relative spatial position can be displayed along with an arrow showing where the rover is, also how fast it is moving and other data.

11 Claims, 13 Drawing Sheets

LOCATING SYSTEM AND METHOD

RELATED APPLICATION

This application is a continuation of application Ser. No. 09/899,612 filed on Jul. 5, 2001 now U.S. Pat. No. 6,980,813 which is based on and claims priority from provisional application Ser. No. 60/218,454 filed on Jul. 14, 2000 and claims priority from the filing date of each of them. This application is also a continuation of application Ser. No. 10/421,967 filed on Apr. 23, 2003. The content of all of the foregoing are incorporated by reference herein.

FIELD OF THE INVENTION

The invention relates to tracking systems that use a radio positioning system such as GPS information and wireless radio communications such as cellular telephone.

BACKGROUND OF THE INVENTION

There are systems that involve a tracking function performed by a centralized and stationary unit. Examples of such systems are shown in U.S. Pat. Nos. 5,594,425; 5,312,618; and 5,043,736. In the usual case, a target's location information is transmitted to a monitoring station where the information is processed and actions taken accordingly. A variation to this is shown in U.S. Pat. No. 5,389,934 which allows the searcher/controller to be mobile; where in one embodiment the system described is a rover which when called by a telephone would become active, relay a voice description of its location and then become inactive; and another embodiment provides an arrow visual to point in the direction of the target, but does not take advantage of the specific spatial relationship calculations used in the present invention

SUMMARY OF THE INVENTION

The invention resides in a system for locating and tracking at least one rover unit from a mobile controller unit, where the mobile controller unit has a radio communication device and a GPS module and the rover has a radio communication device and a GPS module, the controller being programmed to receive GPS position information from the rover unit by way of the radio communication device and using its own GPS module, calculate the relative position and bearing of the rover unit, and using a display on the controller unit showing a relative bearing, distance and altitude difference, or alternatively, map positions of the controller and the rover using available map data. The radio communication module is preferably a cellular telephone. A compass is optionally provided in the controller to provide a direction indication to the rover unit.

The controller unit allows the user to select from displayed options, a selected rover from a stored directory of rovers to activate a "FIND" process to obtain the selected rover's GPS position relative to the controller's GPS position. Also, the rover unit has a stored history of positions of the rover unit(s) so that a historical trail of the rover's positions can be sent to the controller and displayed. Also, selective alarms may be programmed from the controller, into the rover so that when the rover violates the alarm limit, the rover automatically signals the controller and the display shows the rover's selective or absolute position, along with a signal as to the basis for the alarm. Alarms may be spatial such as a boundary or radius passed or may activate at a velocity limit, if the rover starts to move faster that the alarm limit. Also, the rover may be equipped with a manually activated alarm to signal the controller.

Thus the invention has as one use for keeping in touch with children, periodically determining a child's location or trail of movement, or alarm limit violation.

While use of GPS is described above, other radio positioning systems can be used. These include GALILEO, GNSS, LORAN, GLONASS and others.

DETAILED DESCRIPTION

The method and apparatus of the present invention is intended, as a primary application, to enable a person to find a valuable asset which could be a person, upon command and to high precision. An exemplary purpose is such as to enable a parent to find a child.

The system is comprised of a personal hand held unit (controller), and a small, compact, and concealable unit (rover). Each controller unit gives the user the ability to ascertain the precise location of one or more rover units. In addition to all the functions and features of the system as described herein, the system is unique in that each controller unit is a self contained, mobile unit that can provide to the user all the real-time information necessary to locate and find any rover.

The controller unit comprises several primary sub-components including a radio communication module such as a cellular telephone module, a radio positioning receiver/processor module such as a GPS receiver/processor module, an electronic compass, a display, a computer and associated electronics to operate it. The controller provides three distinct and interactive and useful functions. First, the controller unit is a fully functional cellular telephone with all the typical functions and features. Second, the controller unit can display it's own position and the position of a rover unit on a street map. Third, the controller unit provides the relative location of any rover using the controller unit as the center and displaying a bearing arrow.

To operate the system as a locator for a rover, the user selects the FIND feature on the controller screen. The screen displays all the pre-programmed rover names and location addresses such as cellular telephone numbers. The user selects a specific desired rover and touches GO on the interactive screen. The controller unit opens communication with the rover unit by cellular telephone. Using each unit's GPS module, the controller unit determines it's spatial relative relationship with the rover. In one display mode, the controller unit displays the rover unit's location on a street level map, which is capable of zooming and scrolling. Through continuing data from the rover unit, the rover unit's position is tracked on the map as GPS information is sent from the rover unit to the controller unit. In another display, the relative bearing location of the rover unit relative to the controller is displayed as an arrow accompanied by information. In order to obtain use of this arrow feature, a heading for the controller unit has to be established. Heading can also be established on an initiation basis by use of a compass without movement. As is well known, GPS can only provide heading when the receiver is moving. The arrow displays the bearing of the rover relative to the controller taking into account the location of the rover unit, the location of the controller unit, and the heading of the controller unit based on its GPS and optional digital compass data. The information displayed along with the arrow preferably includes controller unit to rover unit distance, rover unit velocity, rover unit height relative to the controller unit, the time at which the rover unit's data was ascertained and the rover unit's coordinate system location such as latitude, longitude and elevation. The arrow display is used primarily when the controller unit and the rover unit are relatively close, such as in a neighborhood, where a directional arrow is useful for the controller unit user. To implement these displays, the controller unit receives GPS data, which provides the relative spatial relationship of the controller unit and the rover unit to high precision, a good as 1 meter accuracy. In order to achieve this precise relative spatial relationship, the rover unit and the controller unit gather and share GPS measurements of pseudo range and carrier phase from the same GPS satellites. Much of the error in GPS positioning occurs due to errors that are common to the two receivers making measurements close in time and space. Therefore, having knowledge of the two receiver's GPS measurements allows for removal of the common errors and consequently, a precise calculation of the relative spatial orientation of the two units as well as good knowledge of the units' absolute position. Optionally, the bearing and distance information can be presented in an audible fashion.

The methods and apparatus to obtain the high precision relative position between the rover unit and the mobile controller unit may be implemented using known technique with GPS. When the rover and controller are fairly close together, their satellite suite reception is likely to have great overlap, perhaps even complete commonality. As they are more separated the commonality will decrease. In use, the preferred method is that the controller will query the rover to have the rover send to the controller time tagged pseudo range and carrier phase measurement on a per satellite basis, and the controller will only use the information from those satellites which it is commonly tracking. The information will be used in the controller unit to compute a precise directed distance between the controller and the rover. This information can be displayed on a map on the controller as two points or location indicators, one for the controller and one for the rover. Also, the rover position history can be trailed by time-sequenced locations including prior locations that can be derived from prior information stored in the rover.

An optional procedure would be that the controller asks the rover to send data only for a specified subset of satellites such as all or some of those, which are being tracked by the controller.

Another optional procedure would be that the controller sends its satellite suite information to the rover and the rover does the computation and sends back its calculated position using only the common satellites.

A further option would be that the controller tells the rover what satellite it is tracking and the rover sends back information from the four satellites with the best GDOP.

Unless expressly stated to be specific, the above descriptions or, other options, for precise relative position contemplates that only commonly tracked satellites are used.

In another embodiment, the controller unit can be sent historical GPS information for the rover unit, which can be displayed as a series of points on the display map or using the controller unit position as a series of points relative to the controller unit to show a trail of travel of the rover over time both historically and contemporaneously, while being displayed.

Another feature is that the controller unit can activate an audible alarm or chime on the rover unit to facilitate finding the rover audibly.

In another feature, preselected limits or boundary conditions set for the rover unit which when the limit or boundary condition is violated or exceeded can self-activate a communication to the controller unit and an alarm signal and automatically display the relative spatial relationship or map relationship between the controller unit and the rover unit. As a cellular telephone, the controller unit can establish voice communication with the rover unit.

Should the controller unit not have the necessary map data for the current positions of the controller unit and the rover unit, it can access a central database via a cellular radio link and download the necessary map data and then resume tracking of the rover unit. Also a normally active alarm button can activate the system to find the rover on the controller unit.

In the exemplary application, a parent is in possession of a controller unit while a rover unit is in the possession of a child. As described below, the person operating the controller unit can find the rover unit and sees on the display the relative spatial location or the absolute map location of the rover unit. Other capabilities are also available, as described below.

It is contemplated in the exemplary application that a parent or equivalent will be in possession of a controller unit, and rover units will be in the possession of one or more children. The rover units can be very small, and are preferably concealed, as it is a purpose of the invention to allow locating of the child even in the event of foul play, although much of it's use contemplates merely checking up on the child, or finding a lost child.

To be operable at least one controller unit and at least one rover unit is needed. There may be a plurality of controller units, such as for two or more persons who desire to track rover units. There will be as many rover units as needed for the persons to be tracked, such as one or more children. Each controller unit can track all of the rover units, or if desired only selected rover units. A set-up procedure is implemented in which the cellular numbers of each rover unit are programmed into the controller unit, along with an identity code, for automatic dialing. Also, each rover unit is programmed for dialing the controller unit, or if there are more than one controller units, for dialing them selectively or automatically in a selected order or simultaneously. Notably, the basic system does not allow for or need any steps to be taken at the rover unit to operate the system (except in the case of the "alarm" procedure which will be explained). Therefore, the cellular transceiver of the rover unit is activated by commands from the cellular transceiver of the controller unit.

Figure 1:
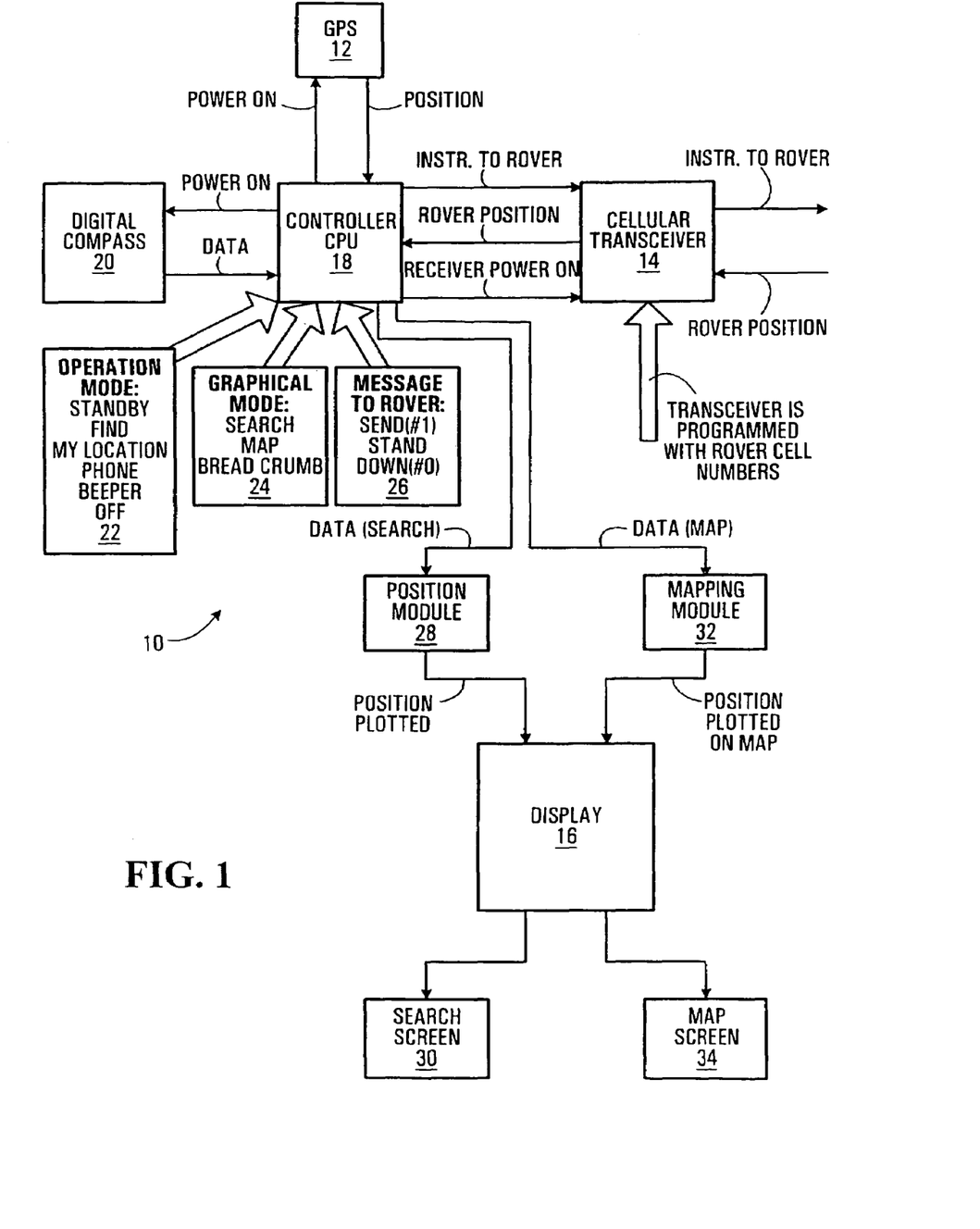
FIG. 1 shows a controller unit operational diagram.
Figure 2:
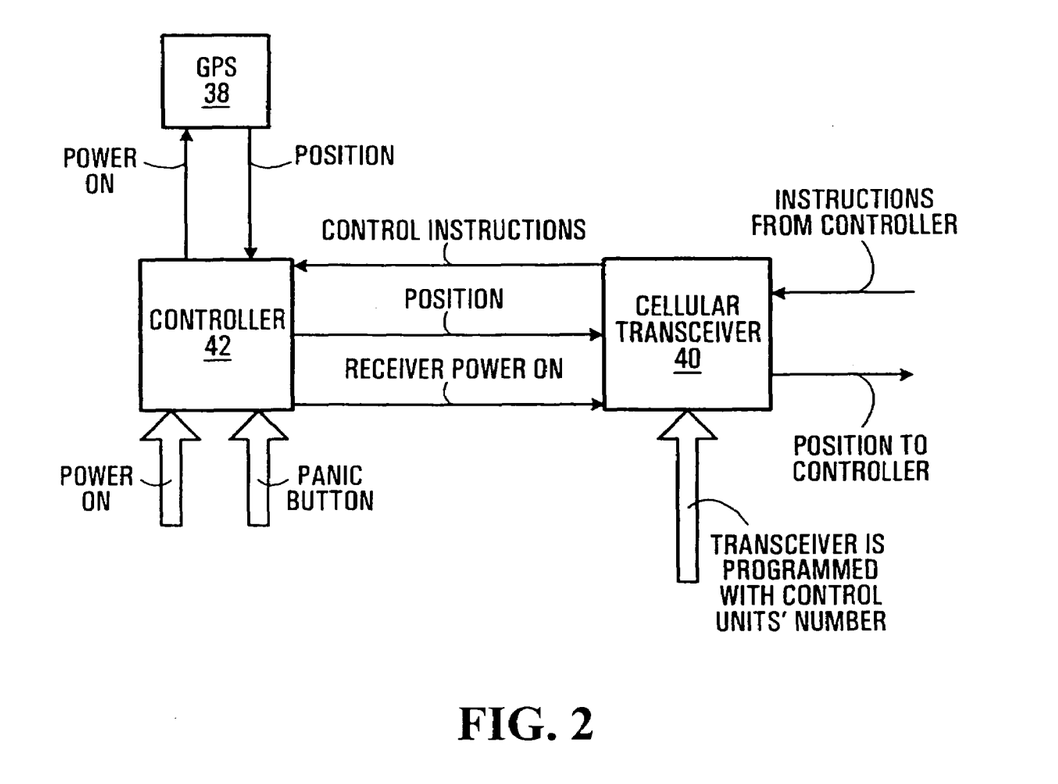
FIG. 2 shows the rover unit operational diagram.

FIGS. 1 and 2 show general block diagrams for the controller and the rover unit modules and their interrelationship. The controller unit 10 has a GPS receiver module 12, a cellular transceiver module 14 a display module 16 and control electronics module including a specially programmed CPU 18 and a digital compass 20. The display 16 is preferably an interactive display such that various command options can be displayed and activated by touching the display screen. Software modules include the Operation Mode Module 22, the Graphical Mode Module 24, and the Message To Rover Module 26. Outputs of the CPU 18 include the Position Module 28 which operates the Search Screen Module 30 and the Mapping Module 32 which operates the Map Screen Module 34.

The rover unit 36 has a GPS receiver 38, a cellular transceiver 40, and a control electronics module including a specially programmed CPU 42. Use of the apparatus and method is best understood with reference to the flow diagrams of FIGS. 3-11 as well as the screen diagrams of FIGS. 12-15.

Figure 3:
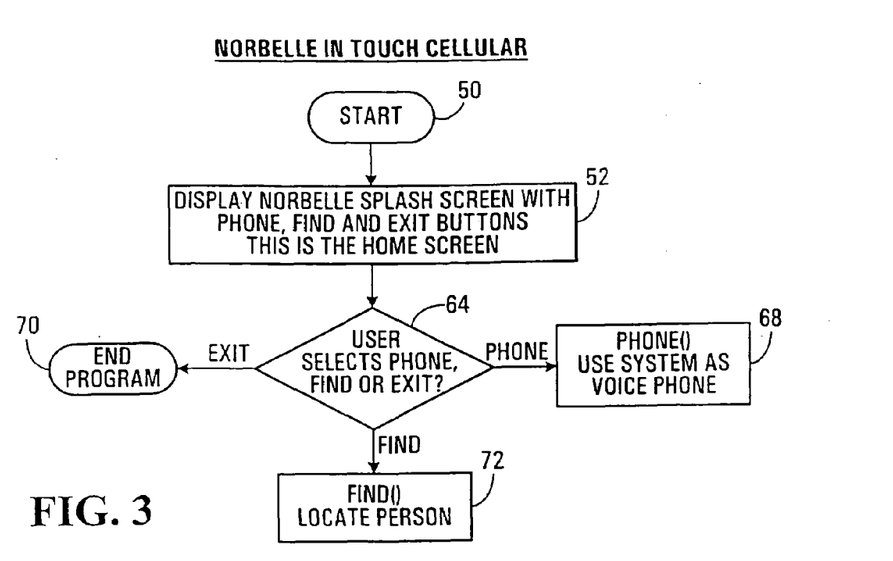
FIG. 3 is a flow chart of the controller start procedure.

Referring to FIG. 3, the controller unit is activated by a power-on step indicated as START 50. This causes the display 52 to open. As shown on FIG. 12, this display, called the home screen 54 has buttons for PHONE 56, FIND 58, EXIT 60, and HOME 62 (which should be muted on the home screen 12). The user selects one of these as at step 64 on FIG. 3. PHONE selection allows use as at 68 as a conventional voice cell phone between the controller unit and a selected rover unit or as a general use cellular phone. EXIT selection turns off the controller unit as at 70. FIND selection begins the find procedure as at 72.

Figure 4:
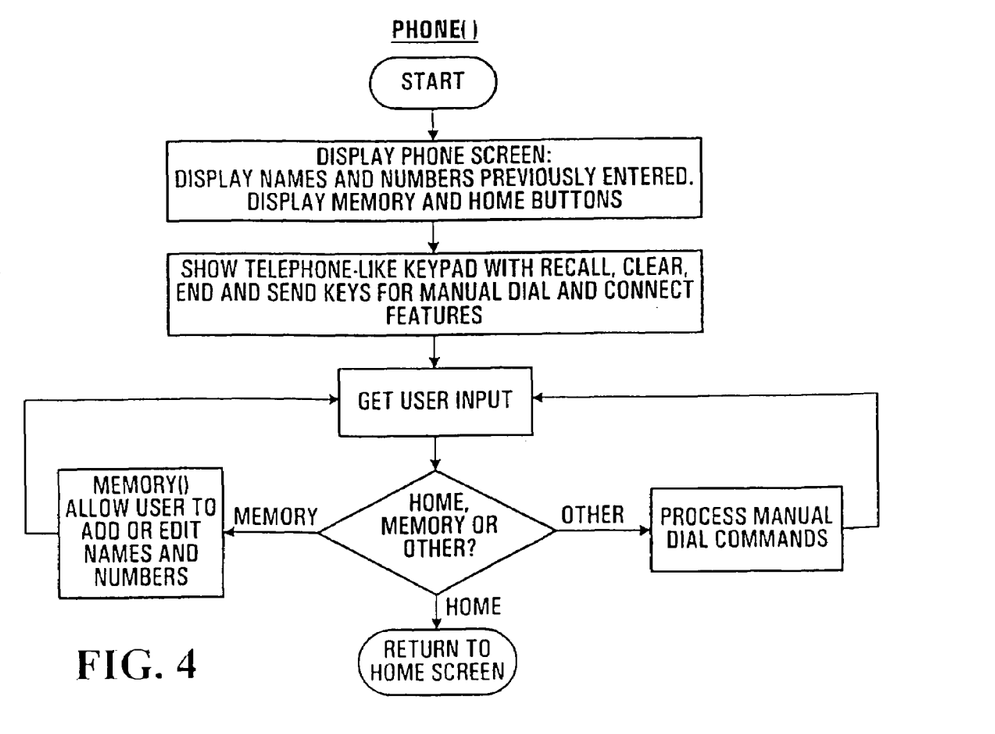
FIG. 4 is a flow chart of the phone start procedure.
Figure 5:
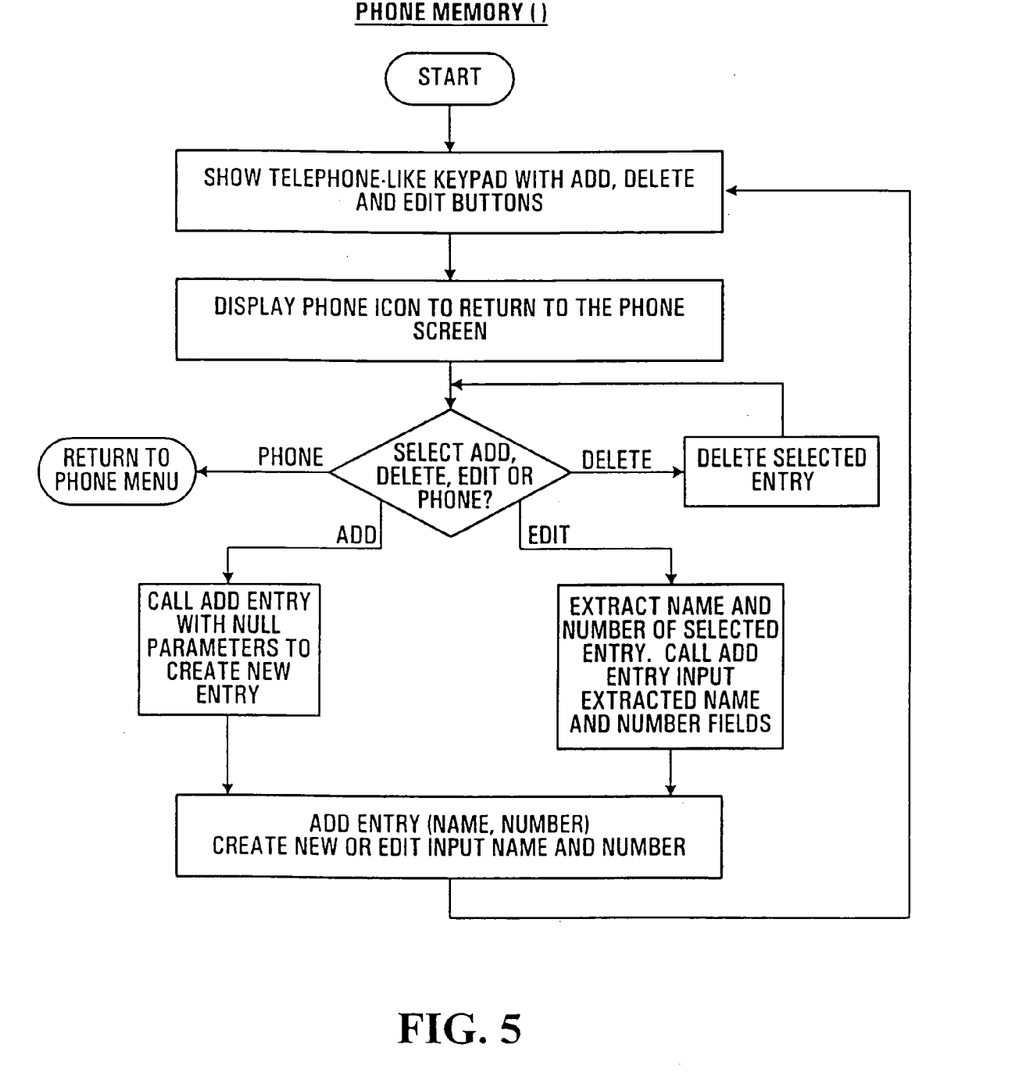
FIG. 5 is a flow chart of the phone memory procedure.
Figure 6:
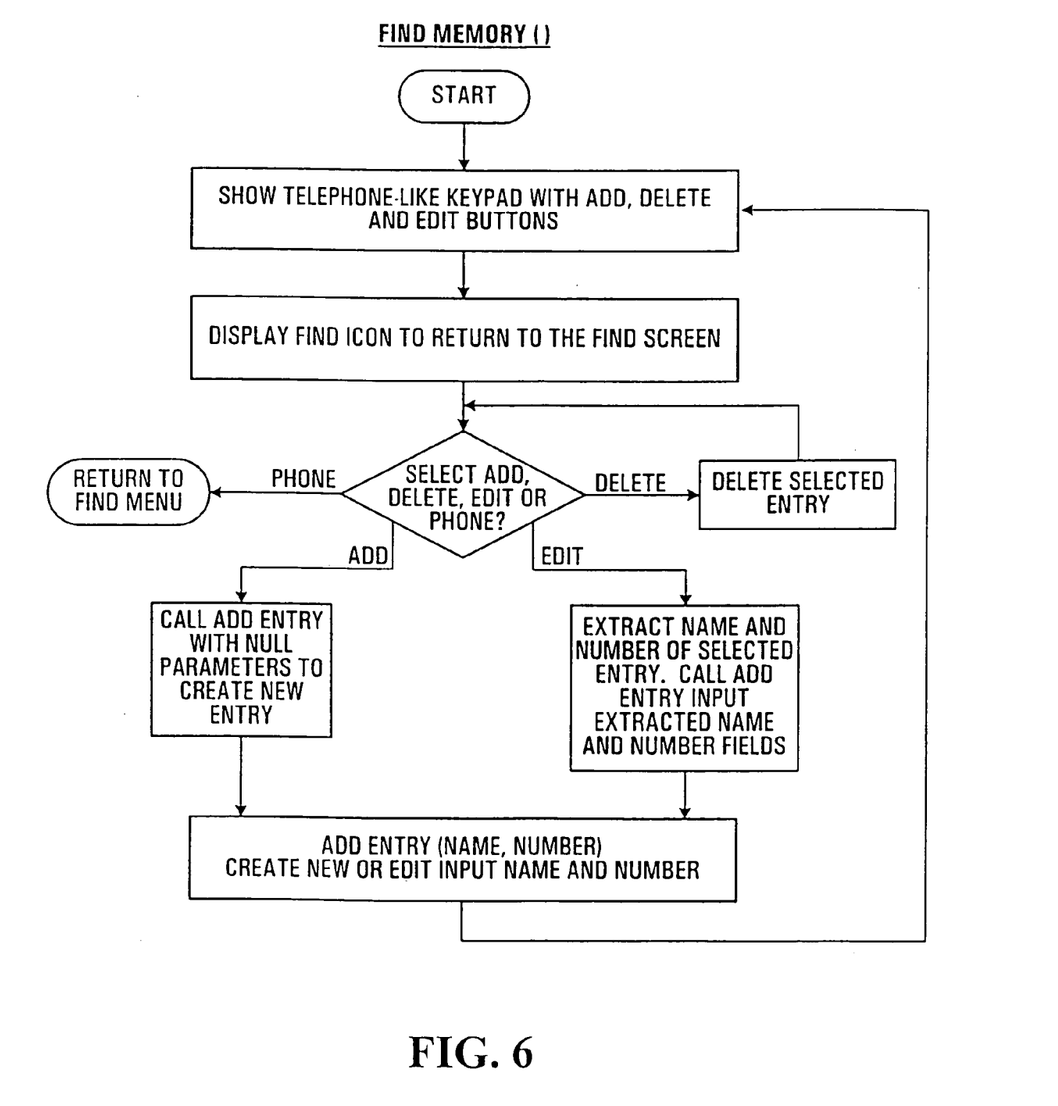
FIG. 6 is a flow chart of the find memory procedure.
Figure 13:
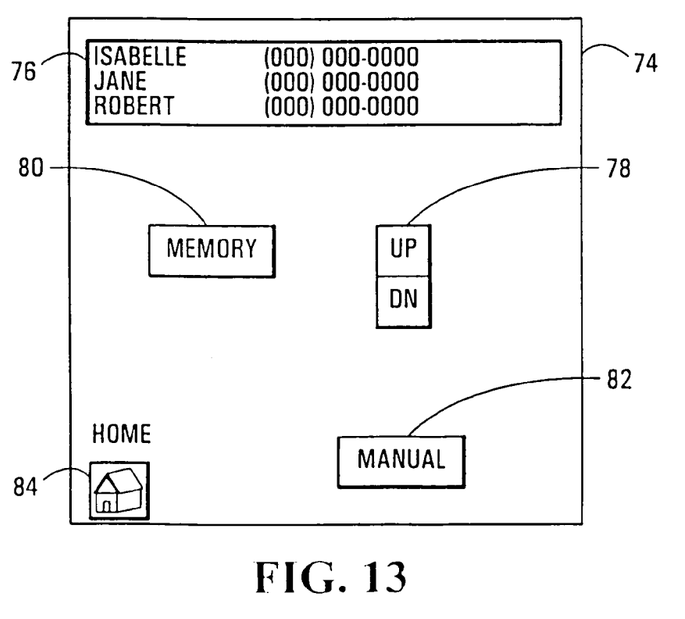
FIG. 13 is a diagram of an interactive phone screen.
Figure 14:
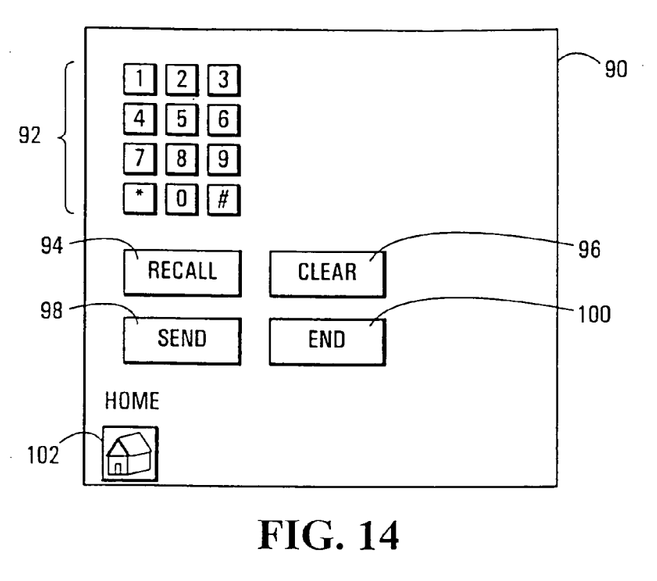
FIG. 14 is a diagram of an interactive manual phone screen.

FIG. 4 shows the procedure if the PHONE button 56 (FIG. 12) was touched. This opens the PHONE screen 74, FIG. 13, which has a scrollable list of preprogrammed numbers 76, an Up/DOWN scrolling button 78, a memory button 80, for adding or deleting numbers, a MANUAL button 82 for going to the screen of FIG. 14 for normal telephone use, and a home button 84 to return to the HOME screen, FIG. 12. If the manual button 82 is touched, the screen 90 of FIG. 14 appears. It has a touch pad 92, a RECALL button 94, a CLEAR button 96, a SEND button 98, END button 100 and HOME button 102. The screens of FIGS. 13 and 14 are for programming numbers (FIG. 13) and using the controller unit as a voice cellular telephone (FIG. 14). The use of the buttons on FIG. 14 are conventional to cellular telephones.

Figure 12:
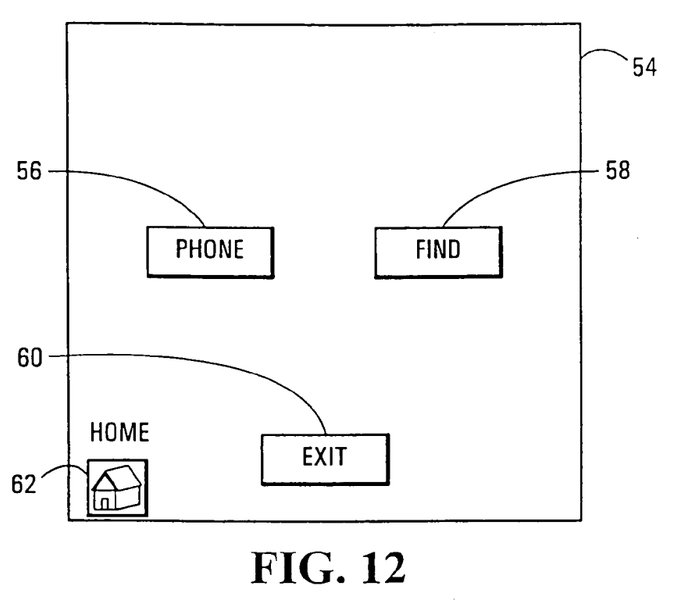
FIG. 12 is a diagram of an interactive home screen.
Figure 15:
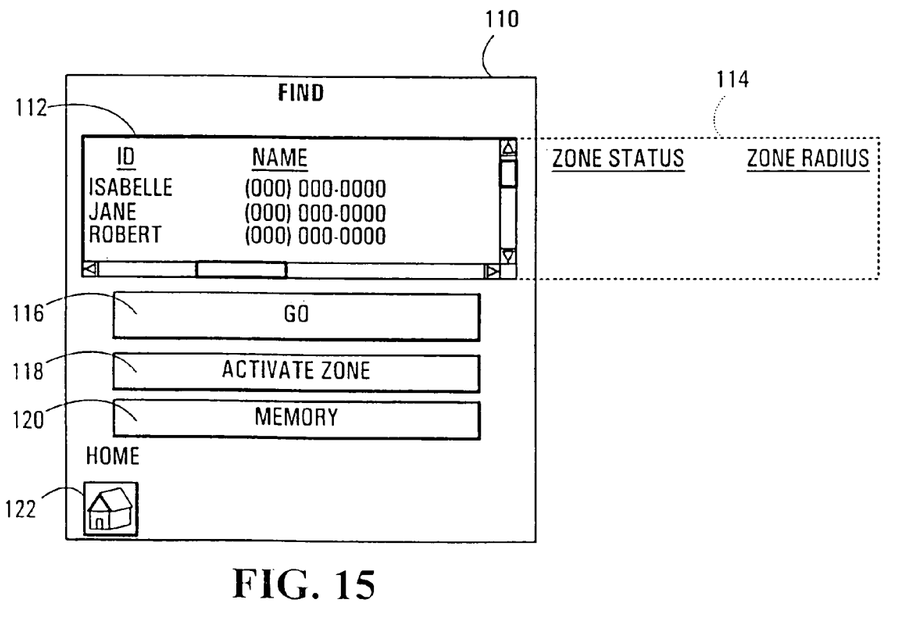
FIG. 15 is a diagram of an interactive find screen.

At FIGS. 3 and 12, if the user selects FIND, the find procedure of the invention is begun. A find screen 110 as shown at FIG. 15, appears on the display. This screen has a scrollable NAME window 112, which may be scrolled vertically to select a rover or horizontally as shown at 114 to display preprogrammed alarm criteria for each rover such as ZONE STATUS and ZONE RADIUS.

Figure 16:
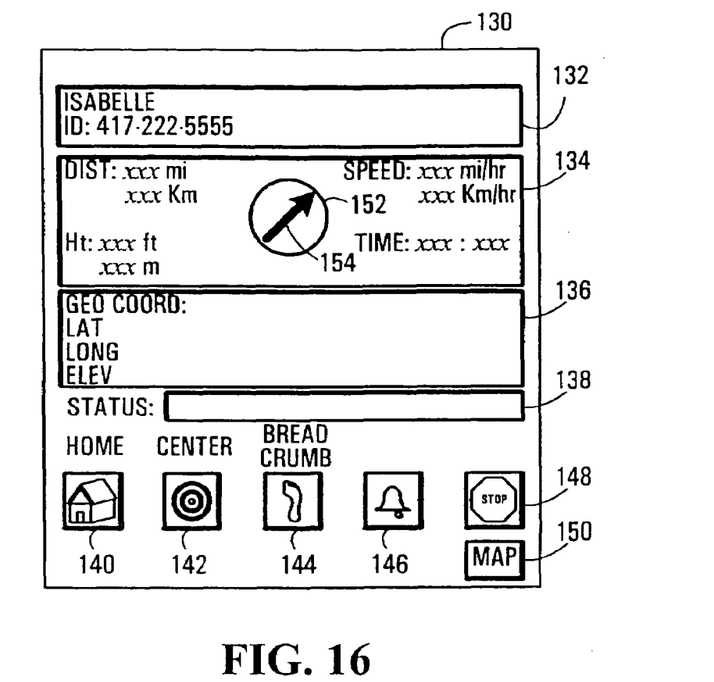
FIG. 16 is a diagram of an interactive find detail screen.

The GO button 116 activates the FIND DETAIL screen of FIG. 16. The ACTIVATE ZONE button 118 allows programming and activating a zone radius. The zone radius will be displayed at ZONE RADIUS and communicated and stored in the rover unit, which is programmed to automatically call the controller unit and sound and/or display an alarm if the zone radius is passed. ZONE STATUS shows whether the rover is inside or outside the displayed ZONE RADIUS. The MEMORY button 120 stores a zone radius selection. The HOME button 122, returns the display to the HOME screen, FIG. 12. Touching the MEMORY button 120 brings up a screen (not shown) to enable programming the functions of the FIND screen 110. This procedure is shown in the flow diagram of FIG. 6, FIND MEMORY.

Figure 7:
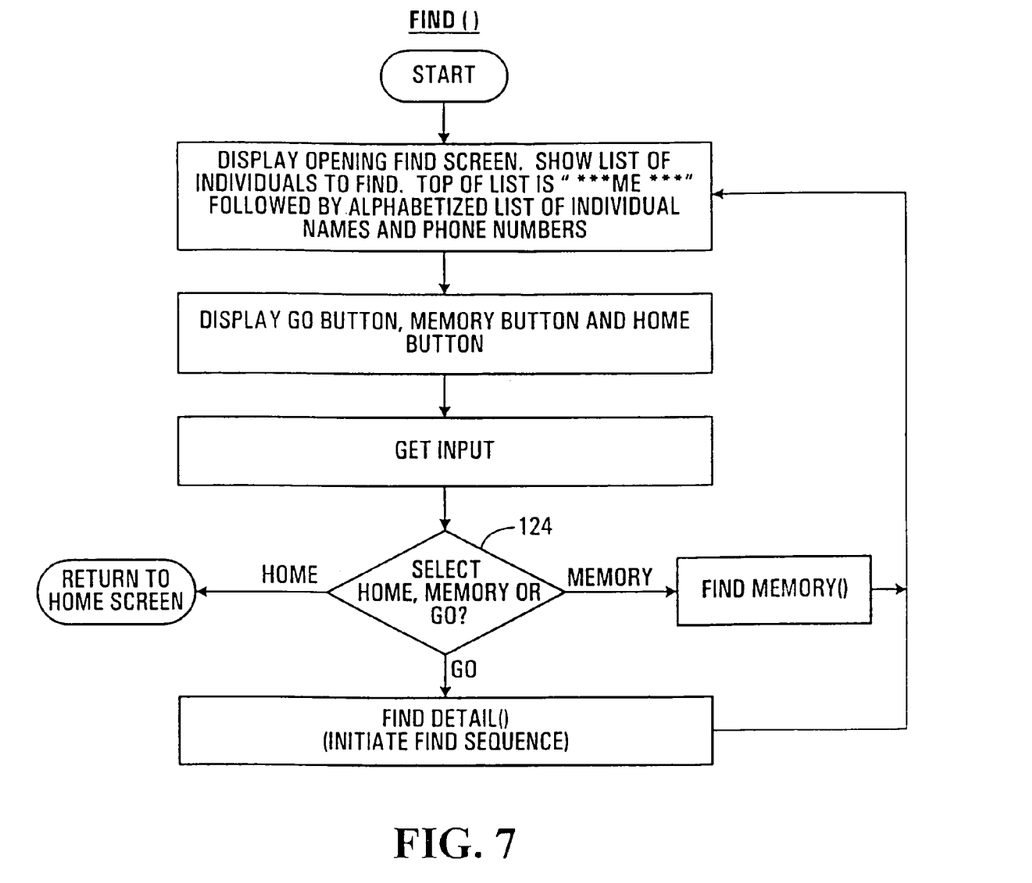
FIG. 7 is a flow chart of the find procedure.

With the FIND screen 110, displayed, the procedure shown in FIG. 7 is implemented. The scrollable NAME window 112 has a list of names and phone numbers that have been pre-programmed. The user now selects HOME 122, MEMORY 120, or GO, 116. If the MEMORY button 120 is touched, the FIND MEMORY procedure begins (FIG. 6) which allows programming or deleting on the NAME window 112.

Figure 8:
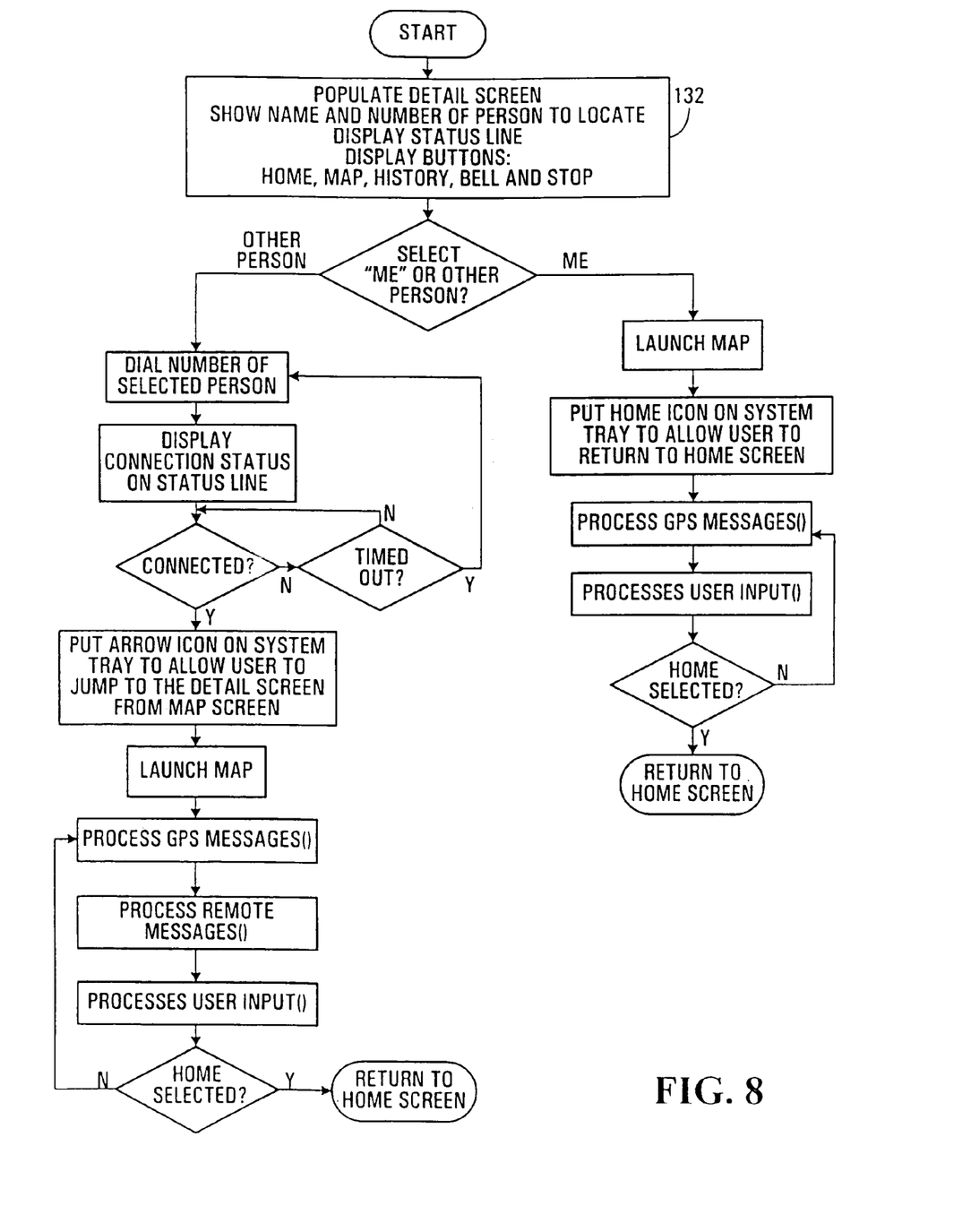
FIG. 8 is a flow chart of the find detail procedure.
Figure 9:
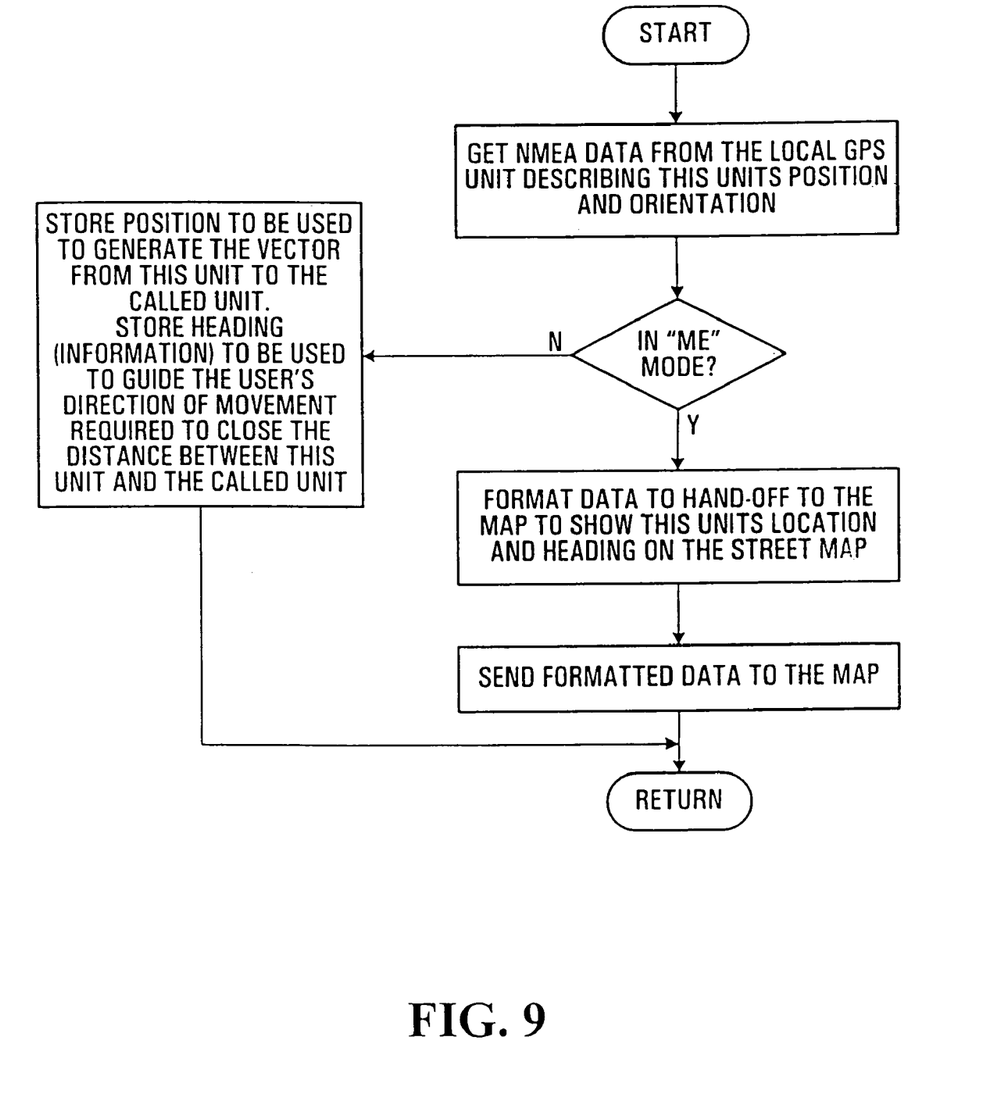
FIG. 9 is a flow chart of the process GPS messages procedure.
Figure 10:
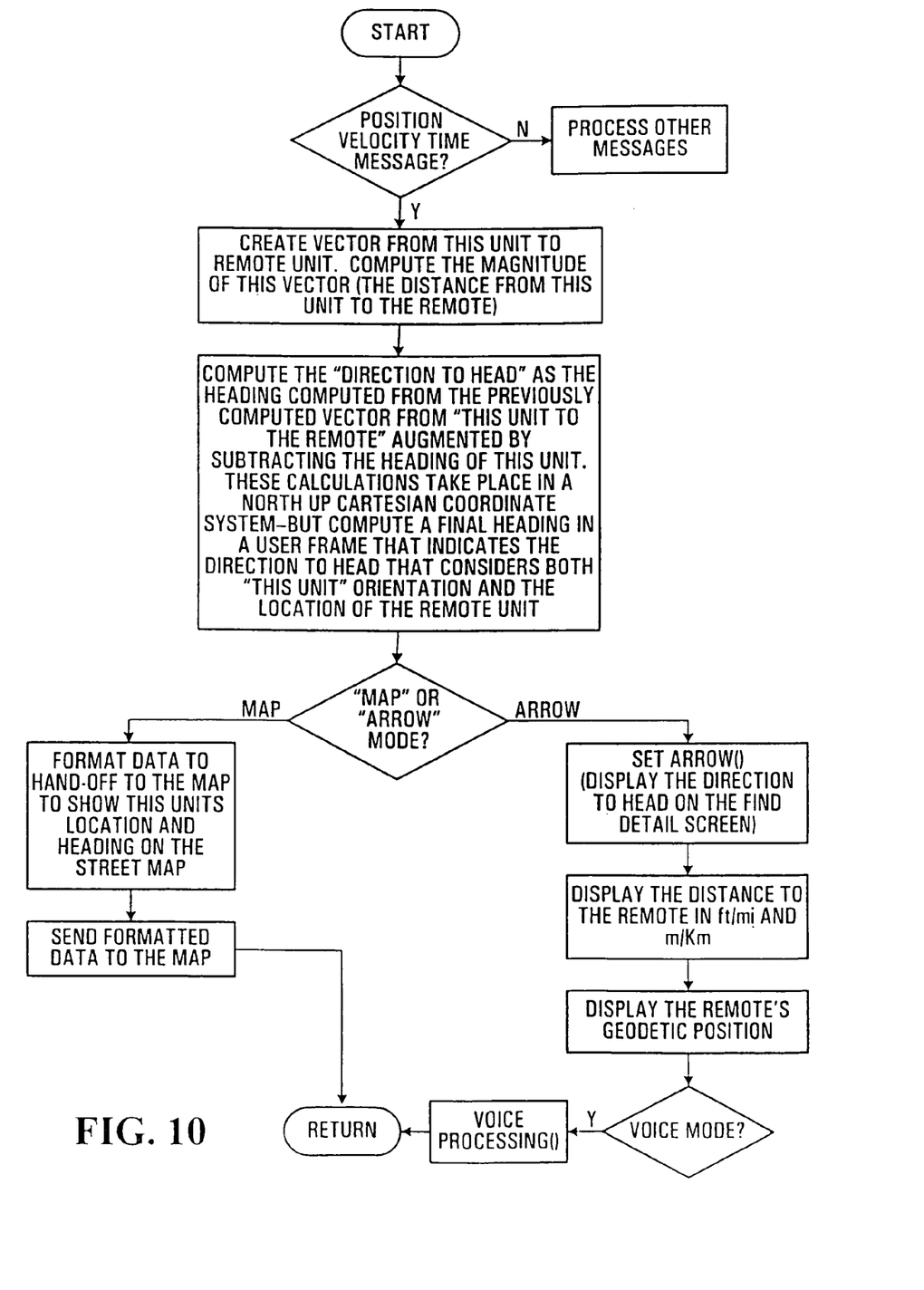
FIG. 10 is a flow chart of the process remote messages procedure.
Figure 11:
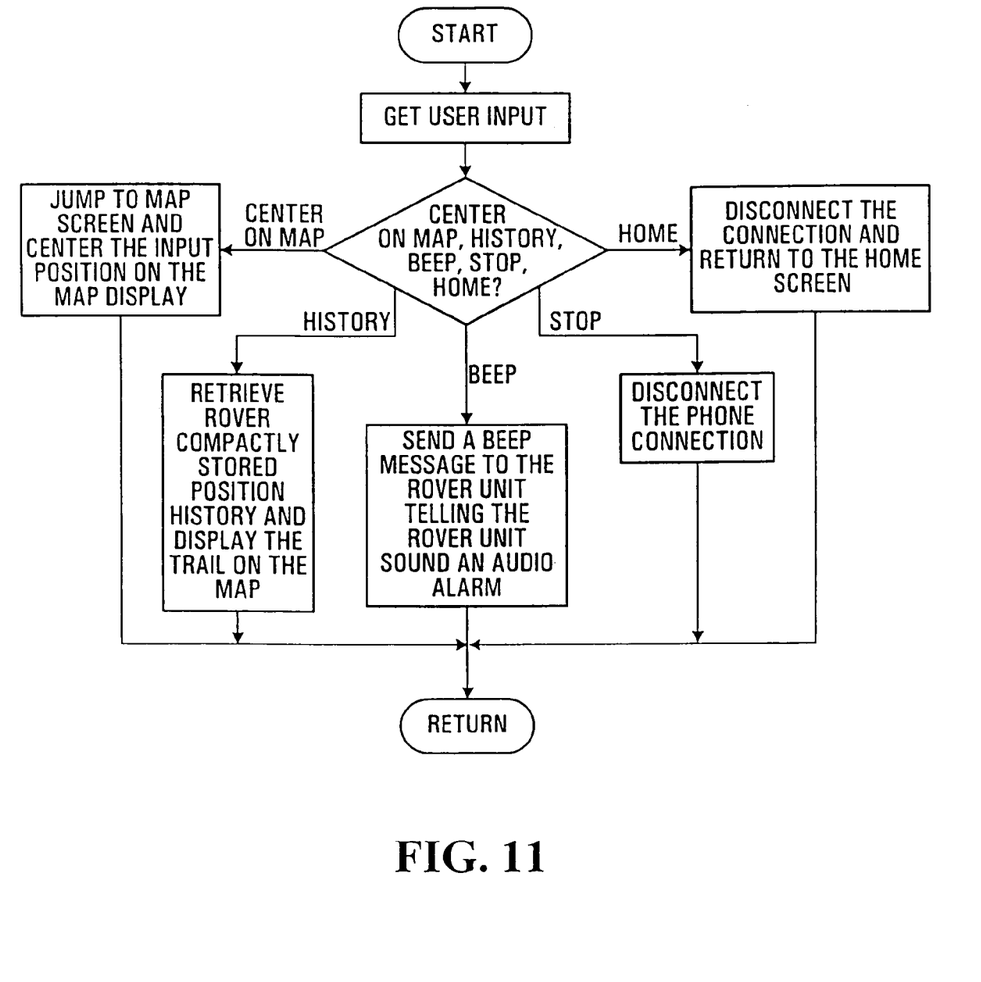
FIG. 11 is a flow chart of the process user input procedure.

If the GO button 116 has been touched, the FIND DETAIL procedure of FIG. 8 is begun and the FIND DETAIL screen 130, FIG. 16, is displayed. As shown in FIG. 8, the FIND DETAIL procedure starts at 132 from the prior touching of the GO button 116 of the FIND screen of FIG. 15 to setup the FIND DETAIL screen 130 of FIG. 16.

The FIND DETAIL screen 130 has an identification window 134, a location and data window 136, a geographical coordinates window 138, a status window 140, and buttons, HOME, 142, CENTER, 144, BREAD CRUMB, 146, STORE, 148, STOP 150 and MAP, 152.

Within the location data window 136, a reserve 154 shows a bearing arrow 156 which operates via the CENTER button 144 for spatial relative positioning of the rover to the controller, in which the arrow 156 shows the bearing of the rover unit relative to the controller unit. This is accomplished using the electronic compass module (FIG. 1) or radio position information such as GPS information to determine its heading.

Touching the HOME button 142, returns to screen FIG. 12. Touching the CENTER button 144 activates display of the spatial relative position bearing arrow 156, using the electronic compass and the GPS positions of the controller and the rover.

Figure 17:
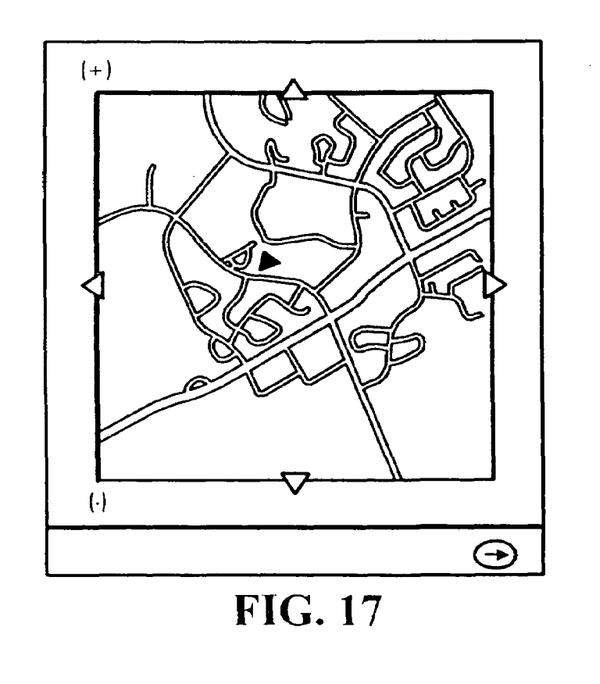
FIG. 17 is a diagram of an interactive map screen.

The BREAD CRUMB button 146 is used with the MAP button 152 which will activate the MAP screen FIG. 17 and will show the positions of the controller and the rover on a map, and with the BREAD CRUMB feature activated, will show a number of prior GPS positions of the rover and will continue to display sequential periodic positions of the rover.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A system for locating and tracking at least one rover unit from a mobile controller unit comprising;
   a mobile controller unit comprising;
      a radio position receiver/processor module for receiving and processing radio position information from a radio positioning source and being equipped with a compass obtain heading information of the mobile controller unit;
      a display;
   a rover unit comprising;
      a radio position receiver/processor module for receiving and processing radio position information from a radio positioning source; and
      a specially programmed computer that is enabled to obtain and use radio positioning information for the rover unit and the mobile controller unit from their respective radio position receiver/processors and heading information for the mobile controller unit and by using said radio positioning information of the mobile controller and the rover and the heading information of the mobile controller unit obtained by the compass to calculate the relative spatial position quantities of the mobile controller unit and the rover unit and the bearing of the rover from the mobile controller unit relative to the mobile controller unit's heading and position and to allow upon selection by a user display on the display of the mobile controller unit a bearing line from the mobile controller unit to the rover unit relative to the mobile controller unit's heading and position whereby the heading of the mobile controller unit is obtained by the compass and the heading so provided is used to calculate and to allow display on the display of the mobile controller unit of the bearing line to the rover unit relative to the heading and position of the mobile controller unit.

2. The system of claim 1 in which the radio positioning source is the GPS.

3. The system of claim 2 wherein the rover unit and the mobile controller unit use the most common suite of GPS satellites available.

4. The system of claim 2 wherein the mobile controller unit is additionally enabled to obtain its heading information from GPS satellites as an alternative to obtaining its heading information from the compass under conditions in which compass heading information is unavailable.

5. The system of claim 1 wherein the radio positioning information of the mobile controller unit and of the rover is obtained from a satellite positioning system.

6. The system of claim 1 wherein the mobile controller unit and the rover obtain radio positioning information from a common set of radio positioning sources.

7. The system of claim 1 further wherein the distance from the mobile controller unit to the rover unit is calculated and the distance is enabled to be displayed on the mobile controller unit.

8. The system of claim 1 further wherein in the specially programmed computer the speed of movement of the rover unit is calculated and is enabled to be displayed on the mobile controller unit.

9. The system of claim 1 further wherein in the specially programmed computer the height of the rover unit relative to the mobile controller unit is calculated and is enabled to be displayed on the mobile controller unit.

10. The system of claim 1 further wherein an audible announcement of the rover unit's bearing direction and distance from the mobile controller unit is provided.

11. The system of claim 1 wherein the radio position information is GPS pseudorange information.

* * * * *